United States Patent [19]
Harvey

[11] 3,860,936
[45] Jan. 14, 1975

[54] SHUTTER CONTROL CIRCUIT FOR CONTROLLING EXPOSURE TIME UNDER LOW LIGHT CONDITIONS

[75] Inventor: Donald M. Harvey, Webster, N.Y.

[73] Assignee: Eastman Kodak Company, Rochester, N.Y.

[22] Filed: Jan. 28, 1974

[21] Appl. No.: 437,109

[52] U.S. Cl............. 354/51, 354/31, 354/53, 354/60 R, 354/60 L
[51] Int. Cl........... G03b 17/20, G03b 7/08
[58] Field of Search............ 354/51, 60, 31, 49, 50, 354/53

[56] References Cited
UNITED STATES PATENTS

| | | | |
|---|---|---|---|
| 3,528,350 | 9/1970 | Schmitt | 354/60 X |
| 3,592,113 | 7/1971 | Wasielewski | 354/51 |
| 3,662,659 | 5/1972 | Metzger et al. | 354/60 |
| 3,698,298 | 10/1972 | Kikuchi et al. | 354/60 |

Primary Examiner—Samuel S. Matthews
Assistant Examiner—James LaBarre
Attorney, Agent, or Firm—D. P. Monteith

[57] ABSTRACT

A photographic camera includes an electronic shutter control circuit for controlling a camera shutter mechanism to achieve relatively high quality photographic prints over a relatively wide range of low scene light values. The control circuit includes a light sensitive circuit having a photoconductive element for producing a light dependent shutter control signal and a light indicator circuit which produces a low light signal only when scene light is insufficient to effect a particular exposure value within a predetermined time period. The light indicator circuit includes a control transistor energizable in response to the low light signal for altering the light dependent control signal so as to limit the open time of the shutter. In another embodiment, the light indicator circuit includes a light pipe for directing the low light signal onto the photoconductor to reduce the resistance thereof so as to limit the shutter open time.

8 Claims, 4 Drawing Figures

PATENTED JAN 14 1975    3,860,936

RANGE OF
LOW SCENE LIGHT (B)
LEVELS EXPOSURE
COMPENSATION
EFFECTIVE:
(A) — CURVE (12)
(B) — CURVE (16)

SHUTTER CONTROL CIRCUIT FOR CONTROLLING EXPOSURE TIME UNDER LOW LIGHT CONDITIONS

BACKGROUND OF THE INVENTION

1. Field of the Invention

This invention relates to electronic exposure control circuits for photographic cameras, and more particularly to a light sensitive circuit for controlling exposure in low light conditions.

2. Description of the Prior Art

A recent trend in exposure control mechanisms for photographic cameras of the hand-held type is to provide apparatus for indicating the adequacy of scene light for effecting an exposure within a particular time interval. This is because the quality of a photograph obtained with a hand-held camera depends, in part, on the ability of the camera operator to hold the camera steady during the film exposure interval. It is generally believed in the photographic industry that high quality hand-held exposures cannot be reliably obtained when the exposure interval exceeds 1/30 second. The operator may be unable to hold the camera steady for these longer exposure times with the result that the film image of the object being photographed is smeared with an attendant loss of resolution in the photographic prints made from the film negative.

It is known in the prior art to provide apparatus in a camera for limiting the exposure interval to a fixed maximum time interval. For example, U.S. Pat. No. 3,245,332, issued to S. Kagan on Apr. 12, 1966 and U.S. Pat. No. 3,500,729, issued to W. T. Rentschler et al on Mar. 17, 1970, disclose shutter control apparatus for terminating the film exposure interval after a predetermined period of time, i.e., 1/30 second. The apparatus disclosed in the aforementioned patents generally includes a first scene light dependent shutter timing circuit and a second light-independent timing circuit having a fixed time constant of 1/30 second. The apparatus further includes means for energizing each of the timing circuits when the shutter is opened. When this happens, each of the timing circuits functions to produce a control signal for closing the shutter. Whichever timing circuit first produces a control signal having a particular amplitude, that signal serves to close the shutter.

It is possible, therefore, with an arrangement of this type to limit or cut-off the film exposure interval to 1/30 second. Of course, an extreme underexposed image may result from a 1/30 second exposure if the prevailing scene light is quite low or dull.

Another approach for limiting exposure time in low light conditions is disclosed in U.S. Pat. No. 3,326,103, issued to J. M. Topaz on June 20, 1967. In this disclosure, photoflash apparatus is provided which modifies the primary light-dependent timing circuit so as to limit exposure time not at a fixed maximum interval as is done in the Kagan and Rentschler et al patents but in a manner related in part to scene light intensity. As is shown in the Topaz patent an auxiliary resistor of fixed value is shunted across aa light-dependent resistor in the shutter timing circuit in response to attachment of a flash device to the camera. In this manner, the RC time constant of the timing circuit has an effective total resistance less than either the resistance of the fixed value resistor or the light-dependent resistor. Under flash light conditions adequate to effect a particular exposure value within a predetermined time period, most of the current by which the timing capacitor is charged flows through the light-dependent resistor and the current through the fixed resistor exerts a smaller influence on the exposure duration. However, when the photoflash light is inadequate to effect a proper exposure within the predetermined time interval, the resistance of the light-dependent resistor is relatively high so the fixed resistor exerts a greater influence in controlling shutter speed in low flash light. Consequently, a maximum exposure interval is established by the fixed resistor.

With an arrangement of the type disclosed in the Topaz patent, the fixed resistor causes the film exposure interval to be limited to a predetermined value in the most extreme low light conditions. However, because of the continual effect the fixed resistor has on the primary light-dependent timing circuit an underexposed image results for those light conditions adequate to effect a proper exposure value within 1/30 second.

The sensitivity of a particular photographic film to light can be represented by the relationship between film density, that is, the logarithm of the opacity of the film, and the logarithm of film exposure. Such a relationshsip, if plotted, is typically shaped in the form of a slanted elongated "S" and is commonly known as a D log E curve or characteristic curve because it illustrates the light sensitivity characteristic of the film. As is well known in the art, a proper exposure is considered to have been made when the film exposure value falls on the straight-line portion of the curve. It is in this portion of the curve that the greatest image contrast exists, and hence, generally, the higher resolving power of the film. If the exposure value lies in the toe portion of the curve, that is, where density is increasing at an increasing rate, the film is underexposed and if the exposure value falls in the shoulder portion of the curve, that is, where density is increasing at a decreasing rate, the film is overexposed.

Many of today's commerically available films have an exposure margin which in cases of limited amounts of underexposure, and for that matter, overexposure, the film can be processed to compensate for what would normally be considered an improperly exposed film to obtain a film negative adequate to produce a good useable photographic print. This can be done by selectively varying some of the film processing parameters in a manner known to those having skill in the art. However, with exposure interval limiting arrangements of the type disclosed in the Kagan and Rentschler patents, the difference between the proper film exposure time and the actual exposure time as determined by such exposure limiting arrangements is so large for the lowest levels of scene brightness that underexposure compensation techniques are not generally effective. On the other hand, with an arrangement of the type disclosed in the Topaz patent the difference between proper exposure time and actual exposure time is reduced for all values of low light and hence such compensation techniques are generally more effective effective an exposure error is introduced even for those light levels in excess of the light level requiring a 1/30 second exposure. These effects can best be seen upon inspection of FIG. 1 of the drawings and, more specifically, comparing the curve therein denoted 10, which illustrates proper exposure time, to the curve denoted 12, which illustrates actual exposure time using exposure control mechanisms of the type disclosed in the Kagan and Rentschler patents, and to the curve denoted 14, which illustrates actual exposure time using the shutter timing circuit disclosed in the aforementioned Topaz patent.

SUMMARY OF THE INVENTION

One of the objects of the present invention is to provide improved electronic exposure control apparatus for controlling a camera shutter mechanism which does not suffer the disadvantages of the aforementioned prior art devices.

A further object of this invention is to provide an improved exposure control circuit for a camera of the type which is hand-held which will provide relatively smear-free exposures under low light conditions yet will produce an actual exposure time as measured by a shutter timing circuit equal to the proper exposure time under intermediate and high scene light conditions.

A still further object of this invention is to provide an electronic exposure control system operable under low scene light conditions to produce time limited exposure of the type in which film processing exposure compensation techniques may be implemented over a relatively wide range of such light conditions to obtain high quality photographic prints.

A further object of this invention is to provide an improved exposure control signal of the type described above having scene light monitoring means for producing an indicator signal to indicate the adequacy of scene light for effecting a proper exposure value within a predetermined time period and in which the indicator signal functions to regulate exposure only under low scene light conditions.

A still further object of the instant invention is to provide an exposure control circuit of the aforementioned type which is of simple design and construction and economical to manufacture.

In accordance with the above objects, an electronic exposure control circuit for controlling a camera shutter mechanism includes a control circuit responsive to prevailing scene light conditions for producing a shutter control signal haaving a particular time dependent parameter proportional to the amount of scene light projected toward a film exposure plane, means energizable for producing a signal to indicate inadequate scene light to effect a particular film exposure value within a predetermined time interval, means responsive to energization of the light adequacy indicating means for modifying the shutter control signal to effectively increase the time dependent parameter thereof, and means responsive to the modified signal to control the shutter mechanism to terminate the film exposure interval when the time dependent parameter equals a predetermined value.

The invention, and its objects and advantages, will become more apparent in the detailed description of the preferred embodiments presented below.

BRIEF DESCRIPTION OF THE DRAWINGS

In the detailed description of the two preferred embodiments of the invention presented below, reference is made to the accompanying drawings, in which.

DESCRIPTION OF THE PREFERRED EMBODIMENTS

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Figure 2:
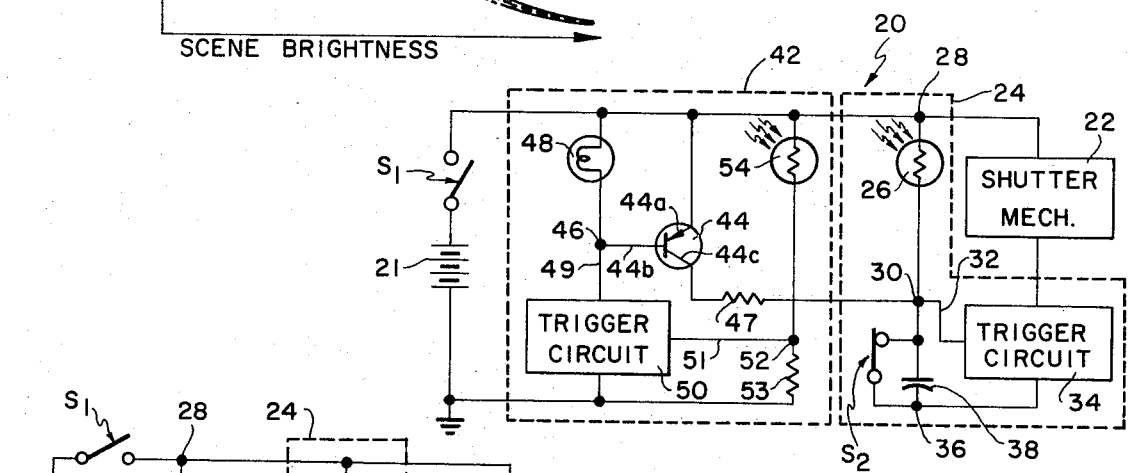
FIGS. 2 and 3 illustrate respectively two preferred embodiments of an electrical circuit for controlling a camera shutter mechanism in accordance with the teachings of this invention.

There is shown in FIG. 2 a circuit denoted generally 20 energizable by a battery 21 upon actuation of a normally open control switch S1 for automatically regulating an electronically controllable camera shutter mechanism 22. Shutter mechanism 22 may be any of a number of well known types of camera shutters such as for example as is disclosed in the aforementioned Kagan and Topaz patents or of the type disclosed in U.S. Pat. No. 3,748,974 issued to T. D. Cochran on July 31, 1973 and assigned to the assignee of the instant invention. Such shutters generally include a pair of opaque blades, one referred to hereinafter as an opening blade and the other referred to as a closing blade, mounted for movement relative to a lens aperture to selectively control the amount of scene light passed through the camera taking lens and projected toward the camera film plane. The opening blade may preferably be actuated mechanically by a shutter release member to initiate a film exposure interval while the closing blade may be actuated electromechanically such as by means of sequentially energizing and de-energizing an electromagnet to terminate the exposure interval once a predetermined amount of scene light is projected onto the film. Such shutters are briefly described merely in a functional manner so as to more clearly illustrate the instant invention in its intended mode of operation.

Operably coupled to shutter mechanism 22 is a control circuit 24 responsive to light for controlling the shutter closing blade in accordance with the amount of scene light projected toward the camera film plane. As shown, circuit 24 comprises a photosensitive element 26 connected between a terminal 28 and a terminal 30, to which is also connected the input 32 of a voltage sensitive trigger circuit 34. Connected in a parallel configuration between terminal 30 and electrical ground 36 is a timing capacitor 38 and a normally closed shutter control switch S2 actuatable to its open position when the shutter opening blade is moved to its open position so as to initiate the exposure interval.

It shall be understood that normally open control switch S1 and normally closed switch S2 are arranged for sequential operation initiated by a manually actuated shutter release member (not shown) or other suitable means well known to those having skill in the art. When switch S1 is initially closed switch S2 remains closed for a brief time interval for a reason made apparent hereinafter.

Photosensitive element 26 may be any of a number of such elements conventionally used as light-measuring devices in photographic apparatus such as a photoconductive element or the like which has a resistance inversely proportional to the level of light incident thereon. Photoconductor 26 and timing capacitor 38 form an RC integrator circuit which by virtue of the aforementioned photoconductive characteristics has a time constant inversely proportional to scene light intensity and functions to produce an electrical control signal at terminal 30 having an amplitude proportional to scene light intensity and time.

Trigger circuit 34 may be of the type known in the art as a comparator circuit and, more specifically, as a Schmitt trigger circuit or the like of the particular type having a normally non-conducting input stage and an output stage which is normally conducting for maintaining the shutter closing blade in its open position. So long as its input signal at terminal 30 is below a predetermined bias level, called the threshold voltage, the input stage is OFF while its output stage is ON. When its input signal exceeds its threshold voltage, the output stage is turned OFF which condition releases the closing blade and the camera shutter is closed.

Operably coupled to shutter control circuit 24 is a light indicator circuit 42 for indicating the adequacy of scene light for permitting quality hand-held exposures within a predetermined time interval, for example 1/30 second, and for modifying or altering the time dependency of the shutter control signal when insufficient scene light exists for effecting such an exposure.

Light indicator circuit 42 includes a control transistor 44, having emitter, base, and collector electrodes 44a, 44b, and 44c, respectively, electrode 44a being connected to terminal 28, electrode 44b being connected to a terminal 46 and electrode 44c being connected to a current limiting resistor 47, which is in turn coupled to timing capacitor 38 as shown. Connected between terminal 28 and 46 is a light emitting source 48 such as an indicator lamp, light emitting diode (LED) or the like for indicating the adequacy of scene light to effect a proper film exposure value within the aforementioned 1/30 second. Also connected to terminal 46 is the output 49 of a trigger circuit 50 which is similar to the aforementioned Schmitt trigger circuit but differs therefrom in that circuit 50 has a reverse functional relationship between its respective input and output stages. That is, trigger circuit 50 is of the type having an input stage 51 which is normally conducting and, in so doing, conducts only when its input signal is greater than a particular predetermined threshold voltage which may, of course, as is understood by those having skill in the art, be of a different value than the threshold of trigger circuit 34. As shown, input 51 of circuit 50 is connected to a terminal 52 to which is also connected a voltage regulating resistor 53 and a photoconductive element 54 as shown. When control switch S1 is closed the series combination of photoconductor 54 and resistor 53 functions as voltage divider to produce an instantaneous relatively fixed voltage at terminal 52 related to the resistance of photoconductor 54, that is the scene light intensity.

In discussing the operation of light indicator circuit 42, it is necessary to consider two levels of scene illumination. The electrical characteristics of resistor 53 and photoconductor 54 are selectively controlled so that the instantaneous voltage appearing at terminal 53 is adequate to maintain normally conducting input stage 51 of circuit 50 ON only if there is sufficient scene illumination to permit a proper exposure value within 1/30 second. If there is insufficient scene light to do so, the photoconductor current is relatively low, which condition produces a relatively low voltage signal at terminal 52. When this happens, the normally non-conducting output stage of circuit 50 is turned ON, which condition serves to establish an electrical circuit through indicator lamp 48 and through output stage 49 to ground 36 to turn the lamp ON. When this occurs, the voltage potential at terminal 46 drops an amount equal to the voltage dropped across lamp 48, which causes transistor 44 to turn ON or conduct and colllector electrode current to flow through resistor 47 to terminal 30.

From the aforementioned operational description of circuit 42, it can be seen that control transistor 44 does not conduct in scene light conditions adequate to effect a proper exposure within 1/30 second.

Consider now the operation of shutter control circuit 24 once switch S2 is actuated and is thereby opened and, in particular, the operation thereof when indicator lamp 48 is energized to indicate a low light condition. When switch S2 is opened, timing capacitor 38 immediately begins to charge at a rate inversely proportional to the product of its capacitance and the resistance of photoconductor 26, that is, at a rate proportional to scene light intensity. This product is high and capacitor 38 charges very slowly in a scene light condition inadequate to effect a proper value within 1/30 second. However, because the collector current flowing through resistor 47 is combined with the photoconductor current at terminal 30, timing capacitor 38 is charged more rapidly to the threshold voltage of trigger circuit 34.

It can be seen that in an environment of the type having insufficient scene light to effect a proper exposure within 1/30 second, indicator lamp 48 functions to notify the camera operator of such a condition and further to cause an auxiliary current signal to be produced so as to achieve a more rapid exposure interval, which interval is functionally related to existent scene light conditions.

Figure 1:
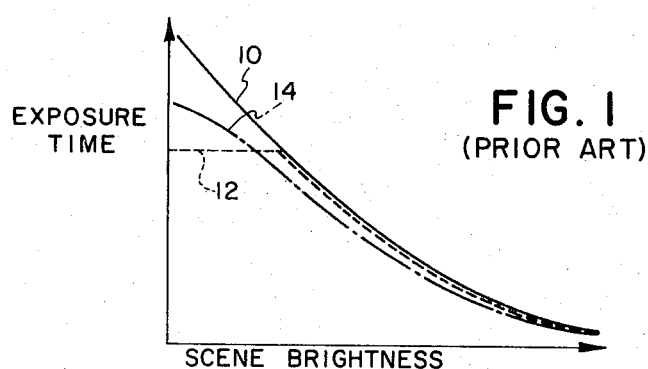
FIG. 1 illustrates a graphical representation of proper camera exposure time as a function of scene brightness, and to more clearly illustrate the prior art there is shown two additional curves representative of the performance obtainable with those prior art exposure control circuits referred to hereinbefore.
Figure 4:
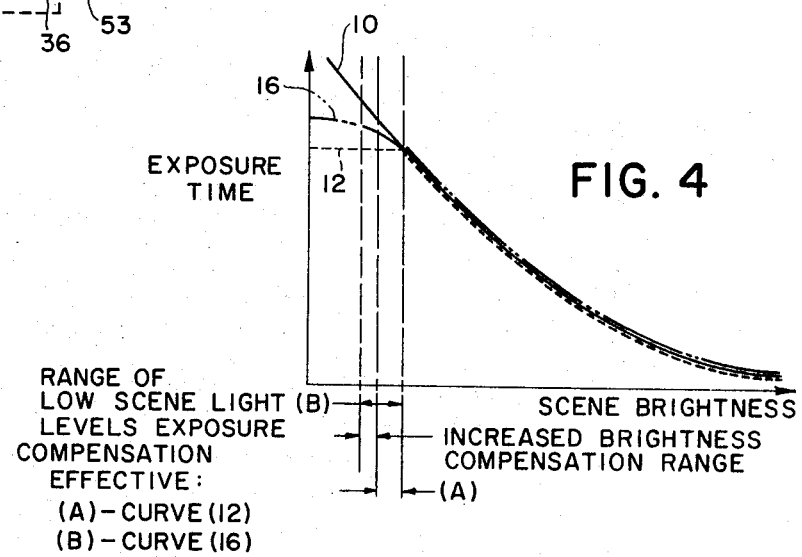
FIG. 4 is a graphical illustration representatively showing the range of low scene light values over which quality photographic prints may be obtained from exposures produced with those exposure control circuits shown in FIGS. 2 and 3 and the range of low light values over which quality prints may be made utilizing a particular type of prior art low light exposure control device.

As mentioned previously herein, it is possible to process certain underexposed films so as to obtain a good useable photographic print. In accordance with the teachings of the instant invention, it is possible to produce a high quality photographic print, through selective modification of the film processing parameters, over a wider range of low scene light conditions while still achieving a proper exposure time for scene light conditions adequate to effect a proper exposure value in less than 1/30 second. This result can perhaps be most clearly illustrated by referring to FIG. 4 and the graphical illustrations therein which serve to enable comparison, on a qualitative basis, the low light brightness range over which a quality print can be made with an exposure control circuit in accordance with the teachings of the instant invention, curve 16, and an exposure control mechanism having a fixed maximum exposure interval, curve 12, such as disclosed in the aforementioned Kagan and Rentschler patents. It shall of course be understood that when the light conditions are adequate to effect an exposure value in less than 1/30 second the actual exposure time follows the proper exposure time and there is no need to modify the processing parameters under such light conditions as is necessary with the exposure control arrangement described in the aforementioned Topaz patent and illustrated by curve 14 shown in FIG. 1.

Figure 3:
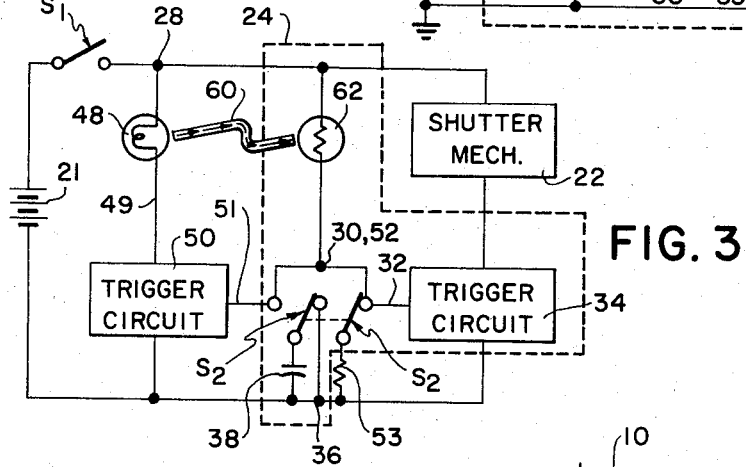

Consider now another preferred embodiment of the instant invention which is shown in FIG. 3 where elements structurally or functionally similar to elements shown in FIG. 2 have been identified with the same numerals. As shown in FIG. 3, means 60 such as a light pipe or an optical arrangement comprised of light directing mirrors or the like constitutes means for directing light from indicator lamp 48 onto a photoconductor 62. When this happens, the resistance of photoconductor 62 is caused to be lowered due to the combined effect of the scene light and the lamp light to produce a faster RC time constant for shutter control circuit 24. In this manner, the exposure time is still limited under low scene light conditions, but is modified so as to produce a wider low light range over which a quality print can be made as is done with the embodiment shown in FIG. 2.

It should be pointed out that with the exposure control circuits of the subject invention some reduction in print quality may result due to the extension of the exposure time beyond 1/30 second in low light conditions which may produce operator-induced smear in the film negative. However, I have found that the reduction in resolution in the photographic prints made from these negatives is more than offset by the more proper exposure achievable over the wider range of low light levels and that overall a higher quality print is achieved with the improved exposure control circuits of the instant invention.

This is perhaps best understood because of the fact that those exposures having an exposure time which has been increased the largest increment beyond 1/30 second, and which therefore most likely have the greatest smear component, are also those exposures which would be the most underexposed with a fixed maximum exposure interval and, therefore, the least likely to be viewable. Whereas those exposures having the smallest exposure time extension beyond 1/30 second not only are the most easily corrected with known processing techniques but tend to have the smallest smear component.

The invention has been described in detail with particular reference to two preferred embodiments thereof, but it will be understood that variations and modifications can be effected within the spirit and scope of the invention.

I claim:

1. In a camera having actuatable shutter means for regulating the amount of scene light projected toward a film exposure plane therein, a light sensitive control circuit for producing a shutter control signal having a time dependent parameter related to light intensity which determines the open time of said shutter means, and means responsive to said control signal for actuating said shutter means to terminate the film exposure interval when said time dependent parameter equals a predetermined value, improved exposure control apparatus for regulating said actuatable shutter means under low ambient light conditions comprising:

a. circuit means, including photosensitive means, adapted to switch between (1) a first state when ambient light intensity exceeds a predetermined level and (2) a second state when ambient light intensity is less than said predetermined level;
   b. signal means connected to said circuit means for producing an indicator signal when said circuit means is in said second state, which indicator signal indicates ambient light is inadequate to effect a particular film exposure value within a predetermined exposure time; and
   c. means responsive to the presence of said indicator signal for modifying said shutter control signal to increase said time dependent parameter thereof to indicate a light intensity greater than the intensity of ambient light whereby the shutter open time is reduced for time intervals greater than said predetermined exposure time.

2. In a camera having an actuatable shutter mechanism and a control circuit including a photosensitive element adapted to produce a control signal having a light dependent parameter which determines the open time of said shutter mechanism, the improvement comprising:

a. switch means coupled to said photosensitive element having a first deenergized state when ambient scene light is greater than a predetermined level and a second energized state when ambient light is less than said predetermined level;
   b. energizable means connected to said switch means for producing an auxiliary signal when said switch means is energized, which auxiliary signal indicates ambient light is insufficient to produce a particular film exposure value within a predetermined time; and
   c. means responsive to the existence of said auxiliary signal for altering said control signal to effectively indicate a scene light intensity higher than ambient light whereby the open time of said shutter mechanism is reduced for exposure intervals greater than said predetermined time.

3. In a camera having actuatable shutter means for regulating the amount of scene light projected toward a film exposure plane therein, improved exposure control apparatus for controlling said shutter means comprising:

a. means for producing a primary shutter control signal having a light dependent time constant which determines the open time of said shutter means;
   b. light-responsive circuit means having (1) a first, deenergized state when ambient light exceeds a predetermined level and (2) a second, energized state when ambient light is less than said predetermined level;
   c. signal means connected to said circuit means for producing an indicator signal when said circuit means is energized, which indicator signal indicates ambient light is inadequate to effect a particular film exposure value within a predetermined exposure time interval;
   d. means responsive to the presence of said indicator signal for producing a secondary shutter control signal; and
   e. means for combining said primary and said secondary control signals to produce a resultant shutter control signal having a time constant of a shorter duration than said primary signal time constant whereby the open time of said shutter means is reduced for exposure times greater than said predetermined exposure time interval.

4. In a camera having actuatable shutter means for regulating the amount of scene light projected toward the camera film exposure plane, improved exposure control apparatus for controlling said actuatable shutter means under low ambient light conditions comprising:
   a. circuit means for controlling said actuatable shutter means to terminate the exposure interval, said circuit means including photosensitive means for producing a primary shutter control signal having a particular light dependent parameter to effect a predetermined shutter open interval in accordance with the intensity of scene light;
   b. means responsive to ambient light for producing an auxiliary signal when the intensity of ambient light is inadequate to effect a particular exposure value within said predetermined shutter open interval; and
   c. means for adding said auxiliary signal to said primary shutter control signal to produce a resultant shutter control signal to regulate said actuatable shutter means such that the interval in which said shutter means is opened is reduced for shutter open intervals greater than said predetermined shutter open interval.

5. In a camera having actuatable shutter means for automatically regulating the amount of scene light projected toward a film exposure plane therein, improved exposure control apparatus for regulating said actuatable shutter means under low ambient light conditions comprising:
   a. circuit means, including photosensitive means, adapted to switch between (1) a first state when ambient light intensity exceeds a predetermined level and (2) a second state when ambient light intensity is less than said predetermined level;
   b. means defining a source of illumination having a first non-conductive state when said circuit means is in said first state, said first state being indicative that ambient light is sufficient to effect a particular film exposure value within a predetermined period of time, and a second conductive state when said circuit means is in said second state for emitting an optical signal, said optical signal being indicative that ambient light is insufficient to effect such an exposure value within said predetermined period of time;
   c. a control circuit, including said photosensitive means, having a particular parameter related to the amount of projected scene light and adapted to produce a shutter control signal having a time constant which determines an open time for said shutter means;
   d. means for directing said optical signal onto said photosensitive means to modify said particular parameter to lower the time constant of said shutter control signal to effectively indicate a higher level of ambient light; and
   e. means responsive to said shutter control signal for actuating said shutter means to terminate the film exposure interval when said signal reaches a predetermined amplitude.

6. Exposure control apparatus as set forth in claim 5 wherein said optical signal directing means comprises a light pipe.

7. In a camera having actuatable shutter means for regulating the amount of scene light projected toward a film exposure plane therein and a control circuit for producing a shutter control signal having a time dependent parameter related to scene light intensity which determines the open time of said shutter means, improved exposure control apparatus for regulating said actuatable shutter means comprising:
   a. circuit means, including photosensitive means, adapted to switch between (1) a first state when ambient light intensity exceeds a predetermined level and (2) a second state when ambient light intensity is less than said predetermined level;
   b. means energizable when said circuit means is in said second state for producing an electrical control signal, said control signal being indicative that ambient light is inadequate to effect a particular film exposure value within a predetermined time period;
   c. means for adding said electrical control signal to said shutter control signal to produce a resultant shutter control signal having a resultant time dependent parameter which effectively indicates a scene light intensity that is greater than the intensity of the ambient light; and
   d. means for actuating said shutter means to terminate the film exposure interval when said resultant time dependent parameter equals a predetermined value.

8. In a camera having actuatable shutter means for regulating the amount of scene light projected toward a film exposure plane therein and a control circuit including a light sensitive element having a particular parameter related to the intensity of ambient light and being adapted to produce a control signal having a time constant functionally related to said particular parameter, which time constant determines the open time of said shutter mechanism, the improvement comprising:
   a. voltage-sensitive switching means coupled to said light-sensitive element and having an output which is deenergized when ambient light is greater than a predetermined level and which is energized when ambient light is less than said predetermined level;
   b. means for defining a source of illumination energizable to produce an optical signal when said voltage-sensitive switching means output is energized, said optical signal being indicative that ambient light is insufficient to effect a particular film exposure value within a predetermined shutter open time;
   c. means for directing said optical signal onto said light-sensitive element to modify said particular parameter thereof to effectively indicate a scene light intensity which is higher than the intensity of the ambient light; and
   d. means for actuating said shutter means to terminate the film exposure interval when the amplitude of said shutter control signal is equal to a predetermined level whereby the shutter open time is reduced for exposure intervals greater than said predetermined shutter open time.

* * * * *